United States Patent
Lindström

(10) Patent No.: US 9,807,695 B2
(45) Date of Patent: Oct. 31, 2017

(54) SON AUTOMATIC TRANSPORT CAPACITY CONTROL

(75) Inventor: Alexander Lindström, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 462 days.

(21) Appl. No.: 14/368,768

(22) PCT Filed: Dec. 29, 2011

(86) PCT No.: PCT/SE2011/051607
§ 371 (c)(1),
(2), (4) Date: Jun. 25, 2014

(87) PCT Pub. No.: WO2013/100832
PCT Pub. Date: Jul. 4, 2013

(65) Prior Publication Data
US 2015/0071145 A1    Mar. 12, 2015

(51) Int. Cl.
*H04W 84/18*    (2009.01)
*H04W 52/02*    (2009.01)
*H04W 24/02*    (2009.01)

(52) U.S. Cl.
CPC ....... *H04W 52/0258* (2013.01); *H04W 24/02* (2013.01); *H04W 52/0206* (2013.01); *H04W 84/18* (2013.01); *Y02B 60/50* (2013.01)

(58) Field of Classification Search
CPC ............. H04W 24/02; H04W 52/0206; H04W 52/0258; H04W 84/18
See application file for complete search history.

(56) References Cited

U.S. PATENT DOCUMENTS 5,867,483 A * 2/1999 Ennis, Jr. ............ H04L 41/0896
  370/252
2005/0136867 A1  6/2005 Carballo
(Continued)

FOREIGN PATENT DOCUMENTS

WO    WO-2010151186       12/2010
WO    WO 2011056048 A3 *  5/2011  ............ H04W 36/32
WO    2011/064696 A1      6/2011

OTHER PUBLICATIONS

European Search Report and Written Opinion for European Application No. 11878576.5, dated Sep. 24, 2015, 9 pages.
(Continued)

*Primary Examiner* — Noel Beharry
*Assistant Examiner* — Ruihua Zhang
(74) *Attorney, Agent, or Firm* — Nicholson De Vos Webster & Elliott LLP

(57) ABSTRACT

The present disclosure relates to embodiments of a method and a network element for real-time adjustment of the energy consumption of a data communications network. The network comprises a number of network elements connected by transport links. User activity status is determined based on status information from user activity monitor. An activity status is determined by aggregating available activity status from activity status reports for each downlink connection and the most recent determined user activity status. The determined activity status is sent in activity status reports upstream, and the performance of associated transport links and internal network element components is adjusted and regulated in accordance with the determined activity status.

20 Claims, 7 Drawing Sheets

(56) References Cited

U.S. PATENT DOCUMENTS

| | | | |
|---|---|---|---|
| 2008/0069134 A1* | 3/2008 | Interrante | H04B 1/0003 370/465 |
| 2009/0003229 A1 | 1/2009 | Loh et al. | |
| 2009/0252065 A1* | 10/2009 | Zhang | H04L 41/082 370/256 |
| 2010/0088398 A1* | 4/2010 | Plamondon | H04L 67/2852 709/220 |
| 2010/0238883 A1* | 9/2010 | Borran | H04W 16/10 370/329 |
| 2012/0225662 A1* | 9/2012 | Jo | H04W 72/0486 455/447 |
| 2012/0236877 A1* | 9/2012 | Weeks | H04L 5/0064 370/468 |
| 2013/0058343 A1* | 3/2013 | Casado | H04L 12/4633 370/392 |

OTHER PUBLICATIONS

3rd Generation Partnership Project; Technical Specification Group Services and System Aspects; Telecommunication management; Study on Energy Savings Management (ESM) (Release 10), 3GPP TR 32.826 V10.0.0, (Mar. 2010), pp. 1-32.

"Green Radio "NEC's Approach towards Energy-efficient Radio Access Networks"", White Paper—NEC, Feb. 1, 2010, pp. 1-5.

"Self Organizing Network: NEC's proposals for next-generation radio network management", NEC Corporation, Feb. 28, 2009, pp. 1-5.

Written Opinion, No. PCT/SE2011/051607, Jan. 8, 2013, 5 pages.

International Search Report, Application No. PCT/SE2011/051607, dated Jan. 4, 2013, 5 pages.

"Mobile technologies GSM", ETSI—GSM, Jun. 3, 2014, 2 pages, http://www.etsi.org/index.php/technologies-clusters/technologies/mobile/gsm.

"The Mobile Broadband Standard", LTE, Jun. 3, 2014, 4 pages, http://www.3gpp.org/technologies/keywords-acronyms/98-lte.

"The Mobile Broadband Standard", SON, Jun. 3, 2014, 3 pages, http://www.3gpp.org/technologies/keywords-acronyms/105-son.

"The Mobile Broadband Standard", UMTS, Jun. 3, 2014, 1 page, http://www.3gpp.org/technologies/keywords-acronyms/103-umts.

Demestichas, Panagiotis, et al., "Green Footprint of Cognitive Management Technologies for Future Networks", MIPRO 2011, May 23-27, 2011, Opatija, Croatia, 5 pages.

Tombaz, Sibel, et al., "Impact of Backhauling Power Consumption on the Deployment of Heterogeneous Mobile Networks", IEEE Globecom 2011 proceedings, 5 pages.

* cited by examiner

SON AUTOMATIC TRANSPORT CAPACITY CONTROL

CROSS-REFERENCE TO RELATED APPLICATIONS

This application is a National stage of International Application No. PCT/SE2011/051607, filed Dec. 29, 2011, which are hereby incorporated by reference.

TECHNICAL FIELD

The following disclosure relates to a method and a network element in communications networks and systems for data package transfer.

BACKGROUND

A mobile base station is a radio and baseband processing system connecting the end mobile user to the mobile network. The base station may be distributed geographically in main-remote configuration or centralized with radio and baseband processing collocated.

Mobile base stations are typically connected via fixed transport links such as microwave, fiber, or DSL copper links. The act of transmitting data from the base station via possibly other base stations and aggregation points to the mobile core network is referred to as backhauling or radio access network transport. The network of transport links, base stations, and any other intermediary node before the mobile core network is referred to as the radio access network.

The selected backhauling architecture and deployed transport technology will vary depending on a particular deployment scenario. In a rural area, base station density may be less than in an urban area because of different requirements on network capacity. In rural areas, microwave may be a better choice of transport technology because the greater ability to avoid line of sight obstacles in those areas.

The base stations in radio access networks in technologies like GSM, see reference [1], UMTS, see ref. [2], and LTE, see ref. [3] are traditionally configured to be always on and are logically separated from the transport links that connect them together. Base stations are logically connected to the mobile core and, depending on technology, other base stations or subsystems.

Self-Organizing Networks, abbreviated SON, see reference [4], encompasses a set of features for 3GPP networks covering self-healing, self-optimization, and self-configuration of mobile networks. Self-healing targets provide automatic repair of network malfunctions, self-optimization automatic optimization of network resources, and self-configuration automatic, a.k.a. zero-touch, deployments.

The inflexibility of not scaling provisioned transport capacity after actual mobile user demand generates excess power. In a perfect network, energy consumption continuously aligns with the transport throughput requirements. When mobile subscriber activity decreases, then the provisioned transport capacity and also the power should be real-time adapted.

Today the main approaches to managing transport capacity in mobile networks are technology-specific local optimization, e.g. adaptive modulation, and manual control, e.g. via a network management system.

Local optimization may result in sub-optimal results. Manual control may be labor intensive and is not dynamic enough. For heterogeneous network deployments, the employed management system will also have to collect and process significantly more data as the number of data-reporting nodes may hundredfold.

SUMMARY

One object of the present disclosure is to provide and present different embodiments for enabling capacity requirements to be automatically determined and adjusted to in networks serving fixed or mobile User Equipments. A reduction of energy consumption may be attained by adjusting the provided network capacity to actual capacity requirements.

Such a result is achieved by different embodiments of a disclosed method for real-time adjustment of the energy consumption of a data communications network. The network comprises a number of network elements connected by transport links. The method comprises a determination of user activity status based on status information from user activity monitor. The method further comprises a determination of activity status by aggregating available activity status from activity status reports for each downlink connection and the most recent determined user activity status. The determined activity status is sent in activity status reports upstream, and the performance of associated transport links and internal network element components is adjusted and regulated in accordance with the determined activity status.

Different embodiments of a network element are disclosed, which embodiments enable real-time adjustment of the energy consumption of a data communications network. The network comprises a number of network elements connected by transport links, said network element comprising a network element controller. The network element controller is configured to determine user activity status based on status information from user activity monitor. The controller is further configured to determine activity status by aggregating available activity status from activity status reports for each downlink connection and the most recent determined user activity status, and to send the determined activity status in activity status reports upstream. The controller is also configured to adjust and regulate the performance of the associated transport links and internal network element components in accordance with the determined activity status.

The disclosed embodiments enable activity status to be automatically determined and adjusted to in a mobile network of telecommunication equipment or a data communications network. By adjusting the provided network capacity to the actual activity status, a reduction in energy consumption may be attained.

The primary benefits of the design of this solution are:
  SON feature. The functionality is distributed onto all nodes in the network resulting in no single point of failure or centralized control point.
  Provides global optimization based on user activity, and that may be controlled by an external management/policy function, e.g. a central manual on/off switch or SLA configurations to preserve the expected service quality.
  Provides a procedure for deactivating/reactivating network links.
  Provides operations descriptions for local components determining the activity status and adjustment to the determined status.

By incorporating all the elements of the suggested embodiments it is possible to provide a self-organizing network that adapts to the network end-points' capacity requirements. In a mobile network, this translates into using the base station intelligence to control transport connectivity.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

While the discussed context of this disclosure is mainly mobile networks, i.e. network providing mobile services, such as Radio Access Networks, RANs, the herein presented methods and network elements NEs works equally well for deployment in networks serving fixed users and User Equipment. There are no limitations associated with considering instead only data communications network equipment. Architecturally, data communications networks are typically very similar to mobile networks.

Figure 1:
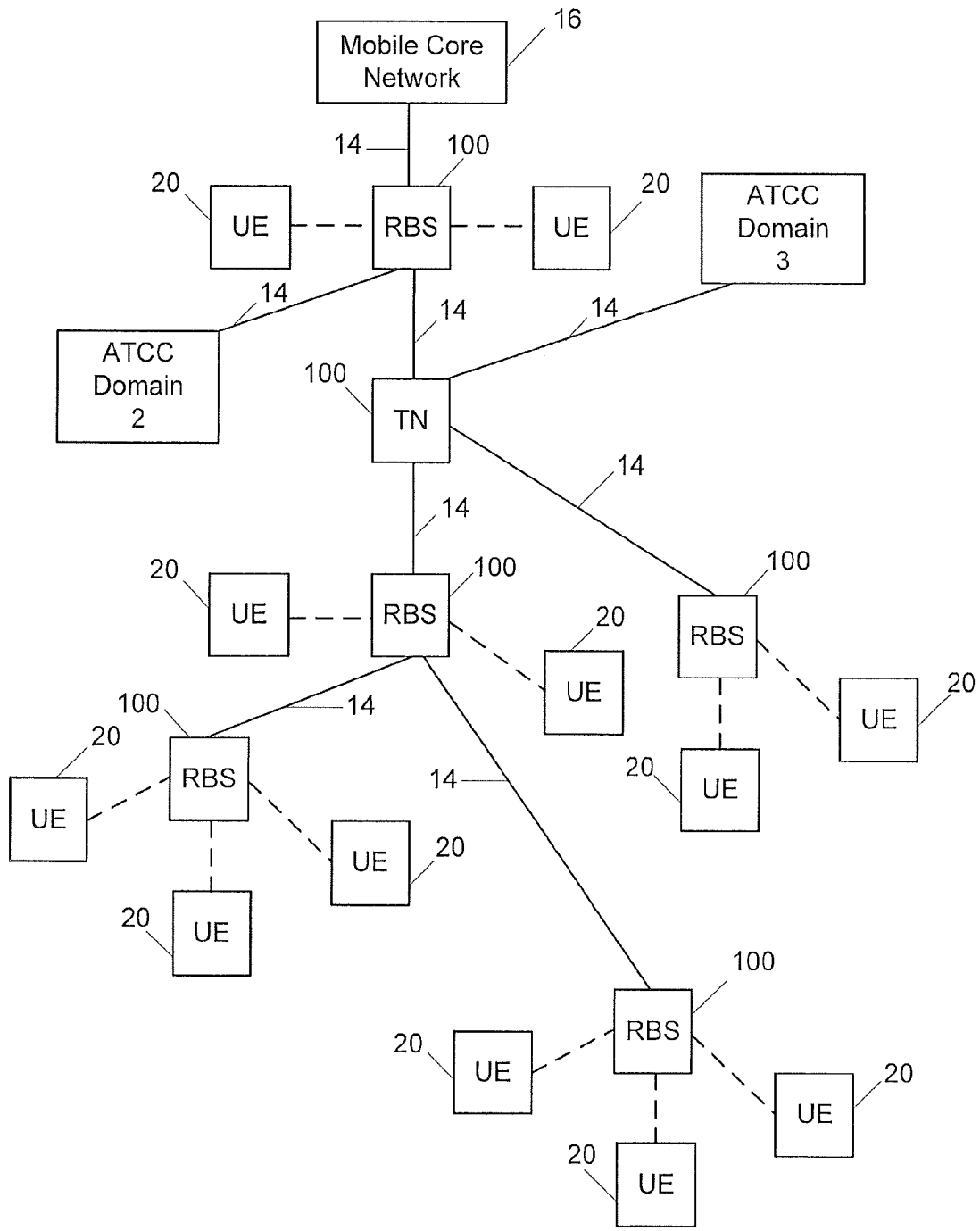
FIG. 1 is a block diagram of an exemplary network in which elements and methods described herein may be implemented.

Embodiments of typical communications network implementations are shown in FIG. 1.

In the illustrated communications network 10, Radio Base Stations, RBSs, 100 are typically connected via fixed transport links 14 such as microwave, fibre, or DSL copper links. The act of transmitting data from one RBS via possibly other RBSs and aggregation points to the mobile core network 16 is referred to as backhauling or sometimes radio transport. The network of transport links, RBSs, and any other intermediary nodes before the mobile core network 16 is referred to as the RAN.

The RBSs that operate in radio access networks in technologies like GSM (see ref. [1]), UMTS (see ref. [2]), and LTE (see ref. [3]) are traditionally configured to always be on and are logically separated from the transport links that connect them together. RBSs are logically connected to the mobile core network 16 and, depending on technology, other base stations or subsystems.

A communications network 10 may comprise different nodes 100, e.g. RBS nodes 100, and Transport Nodes, TNs, 100. Each RBS is an access point to the RAN for UEs 20. An UE 20 has a radio interface for connecting wirelessly to a radio interface of the RBS 100, and vice versa, over an air interface. The RBS and the UE establish a downlink connection from the RBS to the UE and an uplink connection from the UE to the RBS for sending and receiving user data packet traffic and signaling traffic. A transport node 100 may connect one or more RBSs to each other, and it has no radio interface for communicating with UEs. A node that connects a number of nodes via the fixed transport links to other nodes of the network is an aggregation point. A TN 100 may therefore be regarded as an aggregation point in a network. An RBS node 100 may also act as an aggregation point, as illustrated in FIG. 1.

FIG. 1 is illustrating one network tree belonging to an Automatic Transport Capacity Control domain to which two other networks are connected. Said networks are denoted ATCC domain 2 and ATCC domain 3, respectively. Thus, the illustrated network tree is ATCC domain 1.

The basic concept presented in this disclosure is a Self-Organizing Network feature for Automatic Transport Capacity Control, ATCC, in a network, e.g. as the one illustrated in FIG. 1. The ATCC functionality is provided in all or a number of nodes of a network. The ATCC functionality is provided by a Network Element NE comprising a Network Element Controller, which is described in detail in the text related to FIG. 3. The inventive concept comprises a determination of activity status, reporting of this status to NE neighbours, and interconnection with capacity control functions. The ATCC function may be applied to ring and mesh network topologies. In the case that an ATCC node is equipped with multiple parallel uplinks that should not be capacity aggregated, the uplinks are added to separate ATCC domains.

ATCC domain uplink capacity requirements are determined by aggregating the information of the available downlink capacity requirement reports in the ATCC domain with the available user activity status information.

The re-evaluation of uplink capacity requirements is triggered by a change of capacity requirement for a downlink or a change in the user activity status. A change in downlink capacity requirements triggers a re-evaluation of the uplink capacity requirements in all ATCC domains that a downlink has been added to while a change in the user activity status triggers a re-evaluation of the uplink capacity requirements in all ATCC domains.

ATCC domains are controlled independently of each other and may be populated with any number of downlinks or uplinks. Downlinks may be added to several ATCC domains, but adding an uplink to several ATCC domains would cause contention between domains to determine the uplink capacity requirement for that link. The NE controller does not support this.

When multiple uplinks are added to the same ATCC domain, the uplinks will share capacity requirements. Effectively, the NE controller will then distribute the capacity requirements onto all the uplinks in the ATCC domain. If load balancing is not desired, e.g. if one of the uplinks is a stand-by protection link, then the uplinks should be placed in separate domains.

The activity status determined in a NE contains the user activity status, generated by an active users activity status block, aggregated with all activity status in received activity status reports from downstream neighbours, if any. This activity status is a measure of how loaded an uplink is and therefore appropriately expressed in terms of:
- data throughput;
- number of sessions;
- number of connections;
- number of served users;
- delay;
- delay jitter; or
- a combination thereof.

A user activity monitor in the NE generates the user activity status block input based on monitored network parameters, e.g. number of sessions, number of connections, number of served users.

Via internal logic, the user activity monitor block may be able to identify active users and UEs. Identifying active UEs enables the user activity status block to look up the associated Service Level Agreements, SLAs, and use this to determine the user activity status as described later.

A control element in the NE determines the uplink activity status based on the user activity status generated by the user activity status block also in the NE, if any, and the reports received from downstream neighbouring NE control elements, if any.

Figure 2:
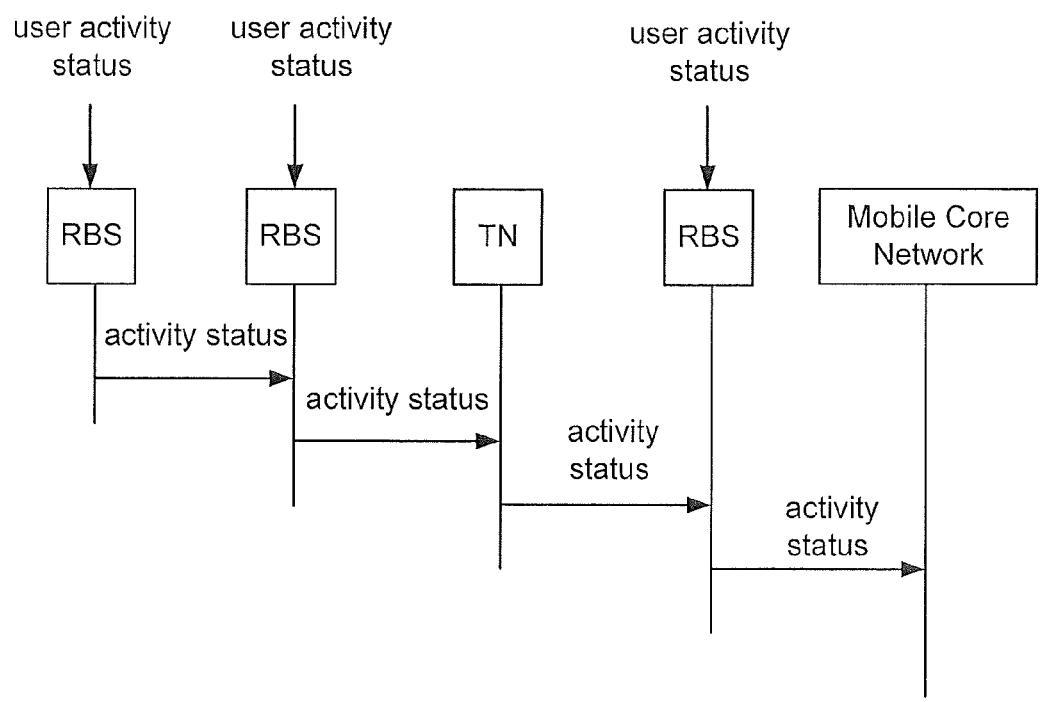
FIG. 2 is a signalling scheme illustrating the flow of activity status reports in an exemplified network.

The control element reports the determined activity status upstream to neighbouring NE controllers, if any, so that the neighbouring NE controllers can determine the activity status at their level based not only on the local monitor, but also on the activity in neighbouring NEs. In this process, the control element may artificially construct activity to preserve transport capacity at various levels and add this to the NE activity status to ensure that sensitive data, e.g. synchronization data, timing data, etc, is transported in a timely manner and that complete link shutdowns are avoided. When the activity status has been determined, the controller block may configure the hardware and software blocks to adjust to the provided capacity (via if3, see FIG. 3). FIG. 2 is a signalling scheme illustrating the flow of activity status reports sent upstream through uplinks from node to node, i.e. NE to NE (following if2 to if4, see FIG. 3).

The re-evaluation of uplink capacity requirements is triggered by a change of capacity requirement for a downlink or a change in the user activity status. A change in downlink capacity requirements triggers a re-evaluation of the uplink capacity requirements in all ATCC domains that a downlink has been added to while a change in the user activity status triggers a re-evaluation of the uplink capacity requirements in all ATCC domains.

In the leaves, i.e. the node level remotest from the mobile core network (16 in FIG. 1), user activity status is collected, processed, and forwarded upstream in an activity status report. The receiving node aggregates the received activity status report with the user activity status information in said node, processes said aggregated information, generates a new activity status report, and sends this report upstream to the next level of NEs in the network. If there is no user activity in a NE, see the TN node in FIG. 2, there is no aggregation of the received activity status with user activity status in said node since none exists. However, the node may be an aggregation point that connects more than one downstream node, i.e. receives activity status reports from more than one NE. Such an aggregation point, or node, aggregates the received activity status reports, processes said aggregated information, generates a new activity status report, and sends this report upstream to the next level of NEs in the network.

Activity status and user activity status may be described in a mathematical form. Please, note that the symbols "Σ" and "+" in the equations below are not limited to summation symbols, i.e. the addition operation, rather said symbols should be regarded as an aggregating operation.

Define a network tree where levels are indexed by level L and sequence number N. Further, define N(L) as the number of NEs at level L, where N=1 is the first NE and N=N(L) to be the last NE at level L. The leaf level of NEs is defined to L=0. Then, activity status per NE may be expressed as:

$$\text{activity status}_{T_{L,N}} \sum_{i=0}^{L-1} \left( \sum_{j=1}^{N(L)} \text{user activity status}_{T_{i,j}} \right) + \text{user activity status}_{T_{L,N}}$$

for $L > 0$, $1 \leq N \leq N(L)$; or $$\text{activity status}_{T_{L,N}} = \text{user activity status}_{T_{L,N}}$$

for $L = 0$, $1 \leq N \leq N(L)$

Activity status per level could be defined in the following way:
Define the leaf level as L=0, $$\text{activity status}_L \sum_{i=0}^{L} [(\text{user activity status}]_i) \text{ for } L > 0; \text{ or}$$

$$\text{activity status}_L = \text{user activity status}_L \text{ for } L = 0.$$

Figure 3:
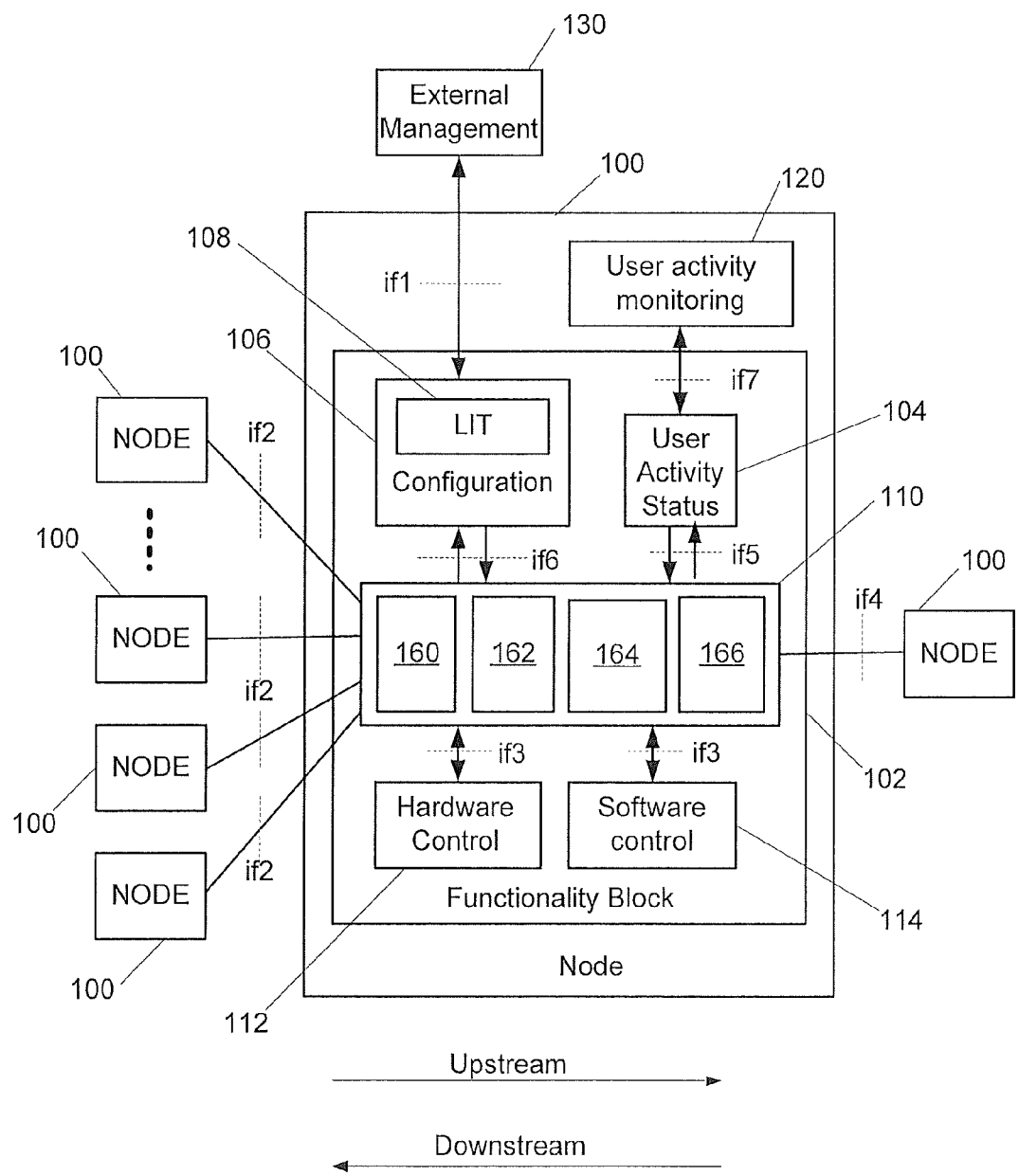
FIG. 3 is a block diagram illustrating an embodiment of a network element NE.

FIG. 3 is an illustration of an embodiment of an ATCC node.

An embodiment of a node 100 comprises a NE 102 for accomplishing Automatic Transport Capacity Control, ATCC, and may be implemented by: a configuration block 106, NE controller 110, a hardware control block 112 and a software control block 114.

The NE controller computes and determines the NE's link capacity requirement, which is the same as the NE's activity status. The most recent determined activity status is used for regulating the performance of the transport links connected to the NE in question.

A configuration block 106 holds configuration data and activity status information in a Link Inventory Table, LIT, 108. Some of the configuration data is necessary input data for determining the activity status of the NE together with the activity status information received in the activity status reports from downstream nodes connected to the node and determined user activity status, if any.

The NE controller 110 continuously keeps the link inventory table LIT 108 in the configuration block 106 updated with the most recent capacity requirements. Downlink entries are updated on reception of downlink capacity requirement reports while uplink entries are updated each time a new activity status is determined.

The determined activity status is relayed to a hardware control block 112 and a software control block 114 that regulate the performance of the transport links connected to the NE in question. Said blocks regulate the performance based on and in accordance with the currently determined link capacity requirements, i.e. activity status of the NE.

The NE controller 110 controls and interacts with a hardware control block 112 and a software control block 114. Said control blocks of a network node involve the software and hardware of receivers, transmitters, transceivers, etc. to which the uplinks and downlinks are connected.

In the interaction with hardware configuration block 112 and software configuration block 114, the NE controller 110 maps capacity requirements to the supported capacity levels, if limited. For example, if capacity is reported in terms of data rate and the link hardware support 10, 100, and 1000 Mbit/s operations, e.g. a triple-speed 10/100/1000 Mbit/s Ethernet link, then the NE controller interacts with the hardware configuration block 112 and/or software configuration block 114 to activate e.g. 100 Mbit/s operations for e.g. capacity requirements of 11 Mbit/s, 50 Mbit/s, and 75 Mbit/s. 10 Mbit/s operation would be enabled for e.g. 4 Mbit/s or 9 Mbit/s.

When the activity status indicates that the capacity requirements for a link are null, the NE controller may be configured to turn off a link transceiver by means of the control blocks. An upstream NE controller then turns off the transmitter part of the transceiver, but not the receiver. The downstream NE controller turns of both transmitter and receiver for optimal power savings.

Depending on link technology, the receiver side of a link may automatically track and adjust to the transmitter operation. In this case, the NE controller 110 needs only to interact with the hardware control block 112 and software control block 114 to configure the transmitter side of a link and not the receiver side.

A bypass parameter is also provided. The bypass parameter is used to indicate bypass of the hardware and software control functionality. In this case, activity status reports are generated and forwarded upstream, but they are not acted on locally. This may be used to support NEs that do not support hardware and software capacity adjustment, but that need to relay activity status reports upstream to NEs that do support hardware and software capacity adjustment.

A user activity status block 104 is optional in network nodes, especially in nodes that do not need to monitor the user activity. Nodes 100 comprising a user activity status block 104 are referred to as being active, while a node missing the block 104 is said to be passive. The user activity block 104 receives user activity samples from a user activity monitoring block 120, which monitors the NE utilization level.

The configuration block 106 implements configuration settings for the NE ATCC function. This block specifies the node link inventory and a bypass parameter. The configuration block settings may be managed locally, by a network engineer, remotely by an external management system 130, or statically preconfigured by an operator, manufacturer, or other party.

The LIT 108 contains information on all locally connected links involved in the ATCC function. The link inventory maps local interfaces to remote interfaces, ATCC domain IDs, user activity status levels, and link types, see illustrated example in table 1.

Different types of interface identifiers, IDs, are possible. In one embodiment, Ethernet interfaces are identified by Ethernet MAC addresses. It is obvious to anyone skilled in the art that other link technologies provide other types of link identifiers that may be used when such links are deployed. A link is identified by the local and remote interfaces mapped together.

A link in the link inventory table is either of type uplink or downlink. Downlinks connect to downstream neighbours and uplinks to upstream neighbours. The required uplink capacity, i.e. NE activity status, is determined and reported by the NE controller 110, as discussed earlier.

Data information carried in reports and messages are transferred via a number of interfaces between the different blocks of the NE 102 and interfaces connecting external blocks or NEs to internal blocks in the NE 102.

The interface if1 connects the external management 130 and the configuration block 106. Configuration data is sent/written and received/read via interface if1.

The interface if2 is a down link that connects two nodes, i.e. networks elements. The activity status reports are received via if2 from a downstream situated NE. A network node may have a number of if2 interfaces.

The interfaces if3 connects the NE controller 110 with the hardware control 112 and software control 114. The NE controller 110 controls by writing activity status and configuration data into the hardware and software controls 112, 114.

The interface if4 is an uplink that connects two nodes. The activity status reports are sent upstream via if4 to the adjacent, neighbouring node 100. A node may have more than one uplink if4. In such a case, the network may preferably be organized in different domains, wherein one uplink connects to a node within the domain while the other uplink or uplinks connects to nodes in other domains.

The interface if5 connects the NE controller 110 and the user activity status block 104. The NE controller 110 reads or receives user activity status from user activity status block 104 and it writes configuration data into the user activity status block 104.

The interface if6 connects the NE controller 110 and the configuration block 106. The NE controller 110 reads stored configuration data and data information stored in the LIT 108. The NE controller 110 has also possibility to write data information into the configuration block to, for example, update the LIT 106.

Finally, interface if7 connects the user activity status block 104 and the user activity monitoring block 120, also denoted herein as user activity monitor. The user activity status block 104 reads or receives user activity samples from a user activity monitoring block 120.

Links may be defined to belong to specific ATCC domains of a network. By separating the network into ATCC domains, it is possible to clearly delineate the ATCC func-

TABLE 1

| | Link inventory table | | | |
|---|---|---|---|---|
| Local interface ID | Remote interface ID | ATCC Domain ID | Type | User Activity Level |
| 11:22:33:44:55:66 | 12:34:56:78:9A:BC | 10 | Uplink | 600 Mbps |
| 11:22:33:44:55:67 | 12:34:56:78:9A:BD | 10 | Downlink | 70 Mbps |
| 11:22:33:44:55:68 | 12:34:56:78:9A:BE | 10 | Downlink | 500 Mbps |
| 11:22:33:44:55:69 | 12:34:56:78:9A:BF | 10 | Downlink | 30 Mbps | tion and to run multiple instances of the functionality in different parts of the network.

ATCC domains are controlled independently of each other and may be populated with any number of downlinks or uplinks. Downlinks may be added to several ATCC domains, but adding an uplink to several ATCC domains would cause contention between domains to determine the uplink capacity requirement for that link. The NE controller does not support this.

When multiple uplinks are added to the same ATCC domain, the uplinks will share capacity requirements. Effectively, the NE controller will then distribute the capacity requirements onto all the uplinks in the ATCC domain. If load balancing is not desired, e.g. if one of the uplinks is a stand-by protection link, then the uplinks should be placed in separate domains.

In accordance with the illustrated embodiment of the NE Controller 110 in FIG. 3, the NE controller comprises means 160 configured to determine user activity status based on status information from user activity monitor. The controller may further be provided with means 162 configured to determine activity status by aggregating available activity status from activity status reports for each downlink connection and the most recent determined user activity status, and sender means 166 for sending the determined activity status in activity status reports upstream. The controller is also configured with means 164 adapted to adjust and regulate the performance of the associated transport links and internal network element components in accordance with the determined activity status by means of the hardware control 112 and software control 114.

Figure 4:
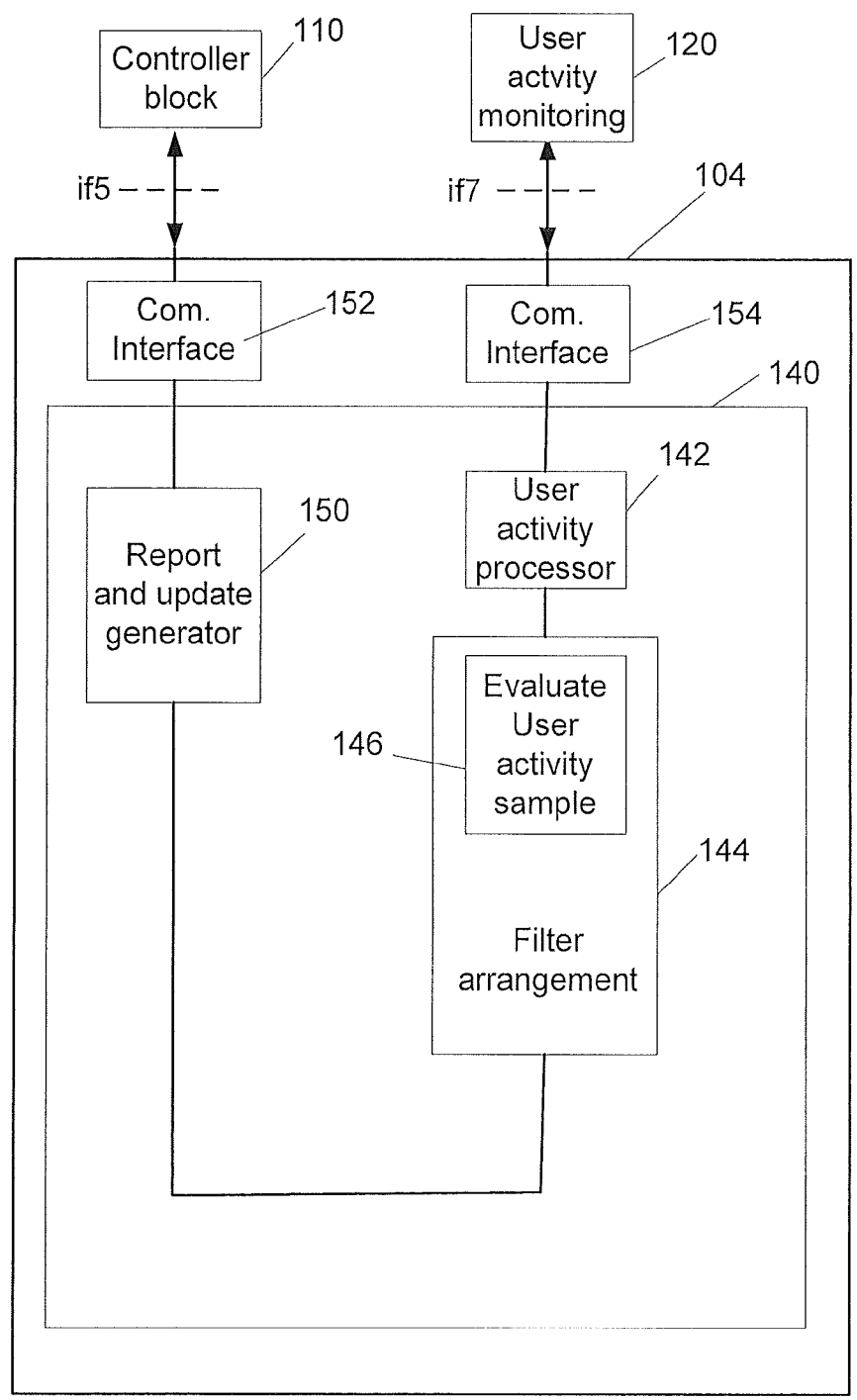
FIG. 4 is a block diagram illustrating an embodiment of a user activity status block.

FIG. 4 illustrates an embodiment of a user activity status block 104. The block 104 also comprises a first communication interface 152 and a second communication interface 154. Said interfaces 152 and 154 may be some kind of input and output ports, transceivers, adaption circuitry, etc. They are connected to the interfaces if5 and if7, respectively, which may be e.g. links, data buses, etc. The controller 140 may further comprise a user activity processing block 142, a block for evaluating the user activity sample 146, a filter arrangement 144 involving an acceptance test for filtering out unwanted user activity status updates, and a report and update generator block 150. The different blocks in block 104 will be better understood in the following description of FIG. 4.

The functional components of the user activity status block 104 monitors by means of a user activity processing block 142 the user activity of users connected to the NE. The user activity processing block 142 is adapted to request the user activity monitoring block 120 for user activity status samples and receive said samples from the user activity monitoring block 120. Alternatively, the user activity processing block 142 may be adapted to send measurement trigger signals to the user activity monitoring block 120 for starting the acquisition of user activity status samples. Thus, the user activity processing block 142 is adapted to collect and store the received samples. The samples are momentary measurement results of user activity status in the monitored NE. The user activity processing block 142 is adapted to process the samples and calculate from the received samples user activity status values. The generated user activity status values are sent to a report and update generator 150. Said generator is adapted to send the user activity status in a message or report to the NE controller 110 of the NE. Said NE controller 110 uses the user activity status as described. Thus, the user activity status block 142 is configured to monitor the user activity of users connected to the NE, e.g. mobile user activity, and to implement internal control logic to generate the user activity status reports.

According to one embodiment, the user activity status block 104 may comprise a filter arrangement 144 for evaluating the user activity and for filtering out unwanted user activity status updates. The filter arrangement 144 is therefore receiving the user activity value before it is sent to the report and update generator block 150. The filter arrangement comprises evaluation means 146 for evaluating the user activity fluctuation between consecutive values. Very small user activity fluctuations may create a frequent increase and decrease of user activity in a certain interval, a.k.a. the ping-pong effect. The filter arrangement 144 may involve a test whether the difference between two consecutive values is less, equal or larger than a pre-set threshold value, which value secures against ping-pong effects. A value less than the threshold value will be cancelled by the filter 144 and the ping-pong effect can therefore be avoided.

The first communication interface 152 may be connected to the NE controller 110 (see FIG. 3) and enables the communication of messages and reports between the NE controller 110 over the interface if5 and user activity status block 104. A second communication interface 154 is adapted to communicate via interface if7 with the user activity monitoring block 120 (see FIG. 3).

User SLAs often contain specifications on min/max/average delivered data rate (throughput) and may contain other parameters such as requirements on availability, delay, and delay jitter. The user activity status block 104 should be able to communicate with other NEs in the network, e.g. policy servers to derive the activity status from associated SLAs when users are identified by the user activity monitor block 120.

Conclusively, it is the user activity status block 104 that controls much of the dynamics of the ATCC function. The controller block 140 is guided directly and indirectly (via activity status reports) by local and remote user activity status respectively.

Figure 5:
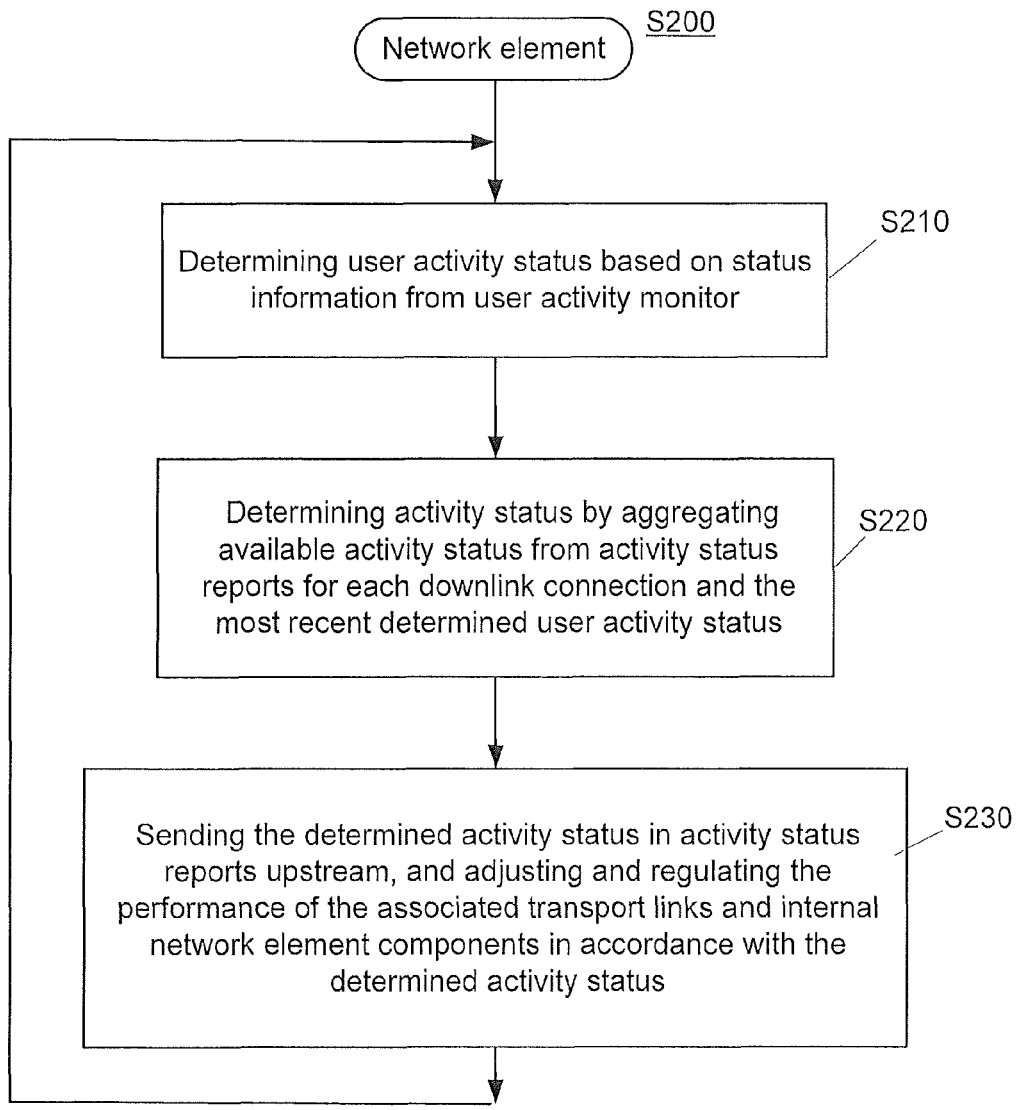
FIG. 5 is a flowchart presenting an embodiment of a method in a network element NE.

FIG. 5 is a flowchart illustrating an embodiment of a method 200 executed and performed in a NE 102, i.e. a node having ATCC functionality, in a communications network 10. Said method provides for real-time adjustment of the energy consumption of a telecommunications or other fixed networks. Said network 10 comprises a number of NEs 102 connected by transport links 14. One or more NEs 102 may be configured to perform following embodiment of the method:

S210:—Determining user activity status based on status information from a user activity monitor. In the NE, a NE controller 110 is configured to perform said step by means of means 160 (see FIG. 3). The user activity status determination means 160 receives information in user activity status reports from the user activity monitor, which is described in FIG. 4. This step S210 is described in more detail in the text below in connection to the flowchart of FIGS. 7 and 8.

S220:—Determining activity status by aggregating available activity status from activity status reports for each downlink connection and the most recent determined user activity status. The NE controller 110 comprises an activity status determination means 162 (see FIG. 3) configured to determine the activity status by aggregating the latest available received activity status reports, i.e. downstream user activity per link, stored in the LIT with the available determined user activity status.

S230:—Sending the determined activity status in activity status reports upstream, and adjusting and regulating the performance of the associated transport links and internal network element components in accordance with the determined activity status. When the NE controller 110 has performed step S220, wherein the uplink activity status is determined, the NE controller 110 may adjust the hardware and software configuration, i.e. the NE transport capacity, in accordance with the determined activity status. The NE controller may therefore comprise an adjustment and regulator means 164 (see FIG. 3) configured to adjust and/or regulate the performance of the associated transport links and internal network element components by means of the hardware control 112 and software control 114. After the adjustment, the NE controller may wait for new reports from the downstream NEs. When one or more report is received, the NE controller performs step S220. Step S210 is repeatedly executed either periodically or when the user activity monitor output changes. The NE controller may also comprise a sender means 166 (see FIG. 3) for sending upstream the determined activity status in activity status reports, which may be generated in said sender means 166.

Figure 6:
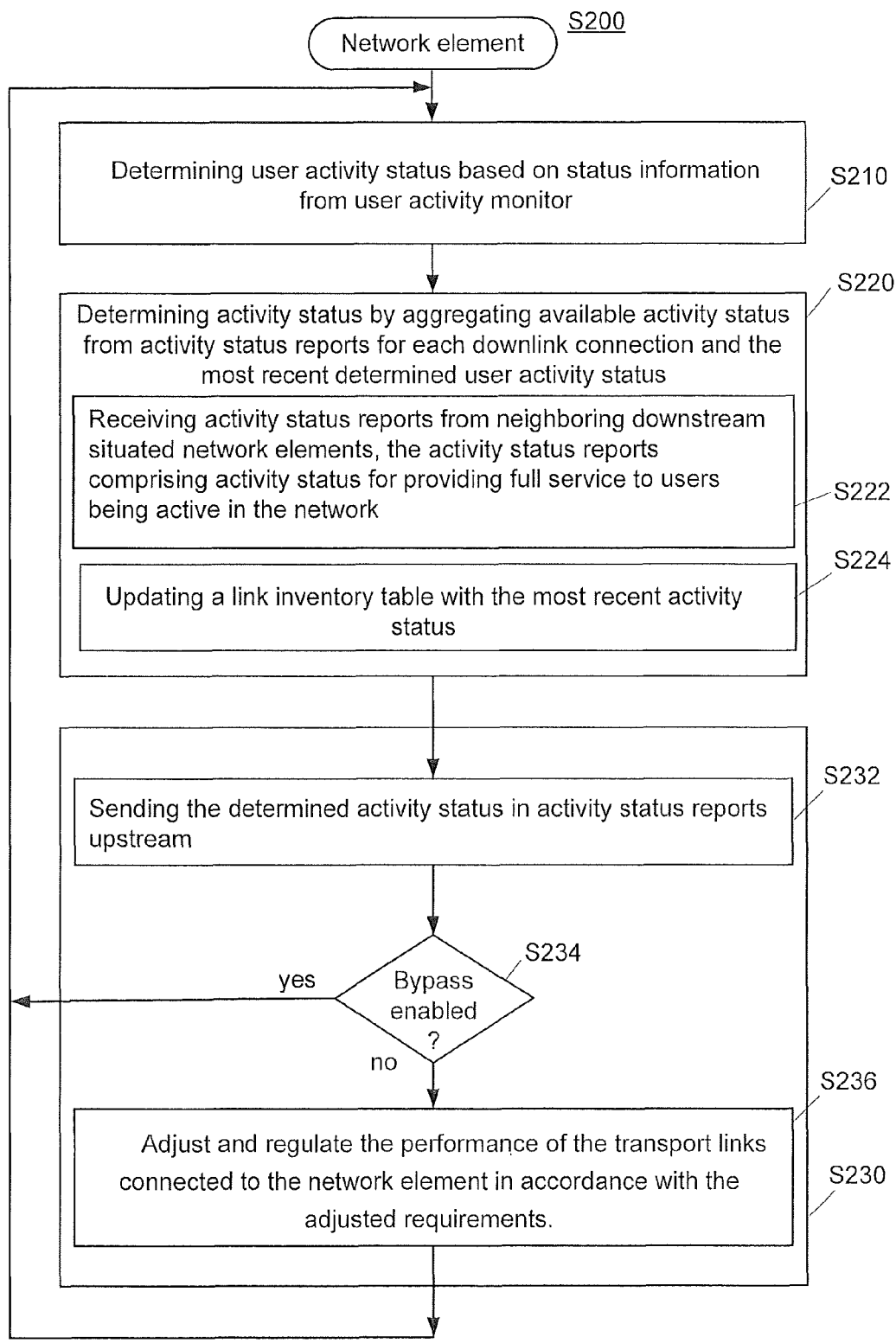
FIG. 6 is a flowchart presenting another embodiment of a method in a network element NE.

FIG. 6 is a flowchart illustrating further one embodiment of a method 200 executed and performed in a NE 102, i.e. an ATCC node, in a communications network 10. Said method provides for real-time adjustment of the energy consumption of a telecommunications and data communications networks. Said network 10 comprises a number of NEs 102 connected by transport links 14, wherein one or more NEs 102 are configured to:

S210:—Determine user activity status based on status information from a user activity monitor. In the NE, a NE controller 110 is configured to perform said step by means of means 160 (see FIG. 3). The user activity status determination means 160 receives information in user activity status reports from the user activity monitor, which is described in FIG. 4. This step is described in more detail in the text below in connection to the flowchart of FIGS. 7 and 8.

S220: Determining activity status by aggregating available activity status from activity status reports for each downlink connection and the most recent determined user activity status. The NE controller 110 comprises an activity status determination means 162 (see FIG. 3) configured to determine the activity status by aggregating the latest available received activity status reports, i.e. downstream user activity per link, stored in the LIT with the available user activity status. This step may further involve following sub-steps:

S222:—Receiving activity status reports from neighboring downstream situated network elements, the activity status reports comprising activity status for providing full service to users being active in the network. The NE controller 110 is configured to receive said activity status comprising user activity status information from downstream neighboring NEs, said user activity status information comprises capacity requirements for providing full service to active users. Step S220 may further comprise following steps:

S224:—Updating a LIT with the most recent activity status. The LIT 108 comprises downlink and uplink entries. The downlink entries are updated on reception of downlink activity status reports while uplink entries are updated each time a new uplink activity status report is determined. The NE controller 110 is configured to update the link inventory table with the most recent activity status reports, wherein downlink entries are updated on reception of downlink activity status reports while uplink entries are updated each time a new uplink activity status is determined. The user activity status block may comprise a filter to filter out unwanted user activity status updates.

S230:—Sending the determined activity status in activity status reports upstream, and adjusting and regulating the performance of the associated transport links and internal network element components in accordance with the determined activity status.

In the following embodiment of the method, step S230 is modified to involve following steps:

S232:—Send the determined activity status upstream. The NE controller may therefore comprise a sender means 166 (see FIG. 3) for sending upstream the determined activity status in activity status reports, which may be generated in said sender means 166.

S234:—Evaluate whether to bypass the hardware/software control or not. If the configuration bypass parameter is set i.e. bypass is enabled, the adjustment of the hardware/software capacity is not performed. If the same bypass parameter is not set, the NE controller 110 steps to S236 and adjustment of the link capacity requirements are performed.

S236:—Adjust and regulate the performance of the transport links connected to the NE in accordance with the adjusted requirements. The NE controller may therefore comprise an adjustment and regulator means 164 (see FIG. 3) configured to adjust and/or regulate the performance of the associated transport links and internal network element components by means of the hardware control 112 and software control 114.

When the NE controller 110 has performed step S220, wherein the uplink/upstream activity status is determined, the adjustment and regulator means 164 in the NE controller 110 may adjust the hardware and software configuration, i.e. the NE transport capacity, in accordance with the determined activity status. The interfaces if3 connects the NE controller 110 with the hardware control 112 and software control 114. The NE controller 110 controls by writing activity status and configuration data into the hardware and software controls 112, 114.

After the adjustment, the NE controller may wait for new reports from the downstream NEs. When one or more report is received, the NE controller performs step S220. Step S210 is repeatedly executed either periodically or when the user activity monitor output changes.

The above described embodiments result in the object to provide and present different embodiments for enabling capacity requirements to be automatically determined and adjusted to in networks serving fixed or mobile User Equipments. A reduction of energy consumption may be attained by adjusting the provided network capacity to actual capacity requirements.

Figure 7:
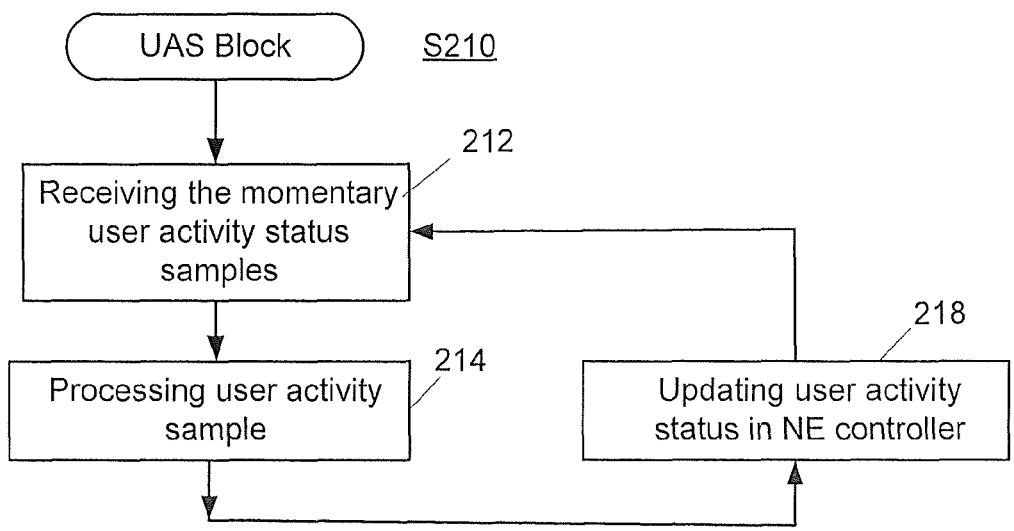
FIG. 7 is a flowchart presenting an embodiment of a method in a user activity status block.

FIG. 7 is a flowchart illustrating an embodiment of a method for determining user activity status by means of a user activity status block 104. Said block is configured to determine user activity status based on status information from user activity monitor, as in S210. The user activity status block 142 triggers a user activity status monitoring device 120 to measure or read the momentary user activity status in the monitored NE. The method comprises following steps:

S212:—Receiving the momentary user activity status samples. The user activity status samples are sent from the user activity monitor 120, i.e. user activity monitoring 120 in FIG. 5, and received by the user activity processor 142 via the communication interface 154 and interface if5.

S214:—Processing user activity sample. The received samples are processed, and from the received samples, user activity status level values are calculated by means of the user activity processor 142. The generated level values are sent to a report and update generator 150. In further one embodiment, the generated level values are sent to a filter arrangement 144, instead of directly to the report and update generator 150. Said embodiment is further described iv FIG. 8.

S218:—Updating user activity status values in NE controller. The generated user activity status values are sent to a report and update generator 150, which is adapted to forward the activity status levels via interfaces 152 and if5 to the NE controller 110 for further use and processing.

Figure 8:
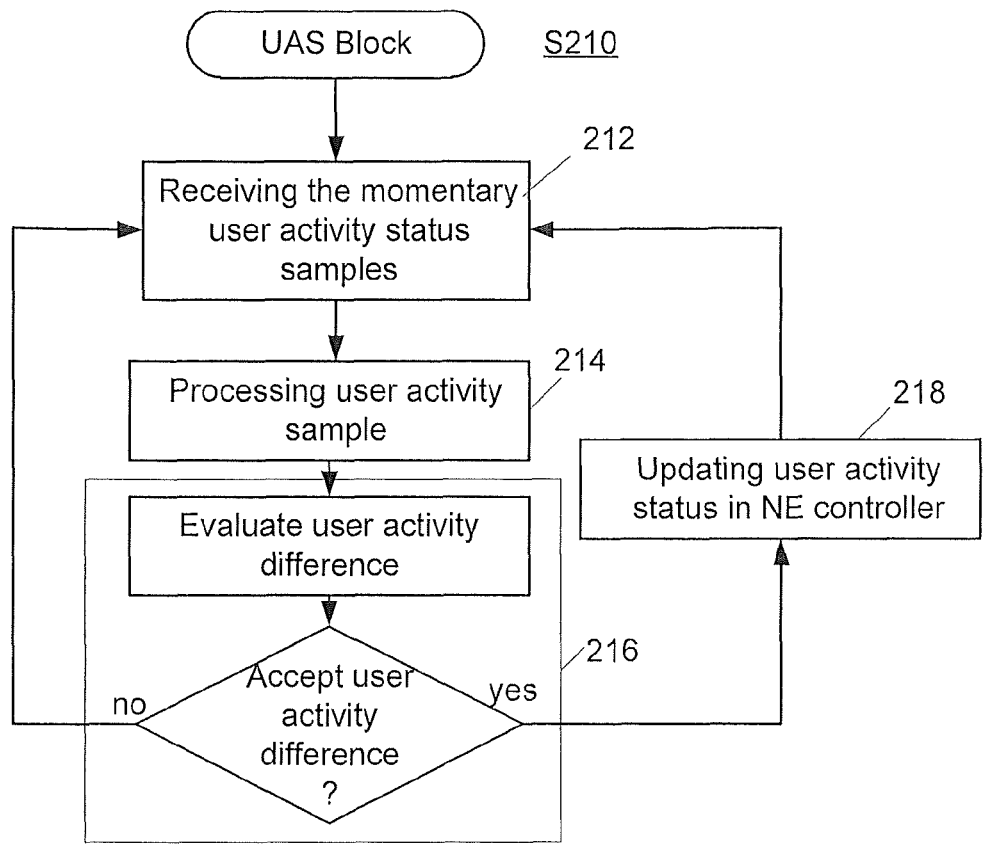
FIG. 8 is a flowchart presenting further one embodiment of a method in a user activity status block.

FIG. 8 is a flowchart illustrating another embodiment of a method for determining user activity status by means of a user activity status block 104. This embodiment comprises further one step, a filtering step:

S216:—Evaluate and filter user activity status levels. The user activity status block 104 may comprise a filter arrangement 144 configured to evaluate the user activity sample. The user activity status block 104 may comprise a filter arrangement 144 for evaluating the user activity status and for filtering user activity status values. The object of this step is to filter out unwanted user activity status updates. The filter arrangement 144 is therefore receiving the user activity status value before it is sent to the report and update generator 150. The filter arrangement comprises evaluation means 146 for evaluating the user activity fluctuation between consecutive values. The filter arrangement 144 may involve a test whether the difference between two consecutive values is less, equal or larger than a pre-set threshold value, which value secures against ping-pong effects. If the evaluated user activity value is less than a certain pre-set threshold value, the filter arrangement 144 deletes, or filters, the user activity value. If the evaluated user activity value is equal to or exceeds a certain threshold value, "yes", the filter arrangement 144 forwards the user activity sample to the report and update generator 150. When a new user activity level value is determined and accepted, a report is generated by the report generator 150 and forwarded via the communication interface 152 and via if5 to the NE controller 110.

The above described embodiments may be implemented in digital electronically circuitry, or in computer hardware, firmware, software, or in combinations of them. Described embodiments of apparatuses may be implemented in a computer program product tangibly embodied in a machine readable storage device for execution by a programmable processor; and method steps of the invention may be performed by a programmable processor executing a program of instructions to perform functions of the invention by operating on input data and generating output.

The above described embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

A number of embodiments have been described. It will be understood that various modifications may be made without departing from the scope of the following claims.

Abbreviations

3GPP $3^{rd}$ Generation Partnership Program
ATCC Automatic Transport Capacity Control
DSL Digital Subscriber Line
GSM $2^{nd}$ generation mobile network
LTE $4^{th}$ generation mobile network
NE Network Element
RBS Radio Base Station
SLA Service Level Agreement
SON Self-Organizing Network
UE User Equipment
UMTS $3^{rd}$ generation mobile network References

[1] *GSM overview*. ETSI web site. http://www.etsi.org/WebSite/Technologies/gsm.aspx [www].
[2] *UMTS overview*. 3GPP web site. http://www.3gpp.org/article/umts [www].
[3] *LTE overview*. 3GPP web site. http://www.3gpp.org/LTE [www].
[4] *SON overview*. 3GPP web site. http://www.3gpp.org/SON [www].

The invention claimed is:

1. A method for real-time adjustment of the energy consumption of a data communications network, said network comprising a number of network elements connected by transport links, said method comprising:
   determining user activity status of a network element based on status information of one or more user equipments (UEs) accessing the data communications network through the network element, wherein the status information is based on one or more of a number of sessions, a number of connections, and a number of served users;
   determining an activity status of the network element by aggregating available activity status from one or more activity status reports, each for a downstream network element of the network element, and
   the determined user activity status of the network element;
   sending the determined activity status in one or more updated activity status reports to an upstream network element; and
   adjusting and regulating the performance of associated transport links and internal network element components of the network element in accordance with the determined activity status.

2. The method according to claim 1, wherein
   the one or more activity status reports comprise activity status for providing full service to users being active in the network.

3. The method according to claim 2, wherein determining the activity status involves:
   updating a link inventory table with the most recent activity status.

4. The method according to claim 1, wherein determining user activity status involves:
   processing received user activity samples to calculate user activity status values based on said user activity samples.

5. The method according to claim 1, wherein determining user activity status involves:
evaluating and filtering user activity status values.

6. A network element for real-time adjustment of the energy consumption of a data communications network, said network comprising a number of network elements connected by transport links, said network element comprising:
a network element controller configured to:
determine user activity status of the network element based on status information of one or more user equipments (UEs) accessing the data communications network through the network element, wherein the status information is based on one or more of the of a number of sessions, a number of connection, and a number of served users;
determine an activity status of the network element by aggregating available activity status from one or more activity status reports, each for a downstream network element of the network element, and
the determined user activity status of the network element;
send the determined activity status in one or more activity status reports to an upstream network element; and
adjust and regulate the performance of associated transport links and internal network element components of the network element in accordance with the determined activity status.

7. The network element according to claim 6, wherein the one or more activity status reports comprise activity status for providing full service to users being active in the network.

8. The network element according to claim 6, wherein the most recent activity status is stored in a link inventory table.

9. The network element according to claim 8, the link inventory table is updated with the most recent activity status, wherein downlink entries are updated on reception of the activity status reports while uplink entries are updated each time an activity status is determined.

10. The network element according to claim 6, wherein the network element is to report the activity status to neighboring upstream network elements.

11. The network element according to claim 6, wherein the network element monitors user activity of users connected to the network element and to generate user activity status reports.

12. The network element according to claim 11, wherein the user status information is generated in terms of:
data throughput;
number of sessions;
number of connections;
number of served users;
delay;
delay jitter; or
a combination thereof.

13. The network element according to claim 12, wherein the network element filters out unwanted user activity status updates.

14. The network element according to claim 6, the network element is to store configuration settings including a bypass parameter.

15. The network element according to claim 14, wherein the stored configuration settings may be preconfigured statically, managed locally, or managed remotely by an external management system.

16. The network element according to claim 6, wherein the network element is implemented as a Self-Organizing Network (SON) function.

17. The network element according to claim 6, wherein the network element is to determine activity status when the user activity status is changed, an activity status report is received or the content in a link inventory table is changed.

18. A non-transitory machine readable storage device having instructions stored therein, which when executed by a programmable processor, cause the programmable processor to perform operations for real-time adjustment of the energy consumption of a data communications network, the network comprising a number of network elements connected by transport links, the operations comprising:
determining user activity status of a network element based on status information of one or more user equipments (UEs)accessing the data communications network through the network element, wherein the status information is based on one or more of a number of sessions, a number of connections, and a number of served users;
determining an activity status of the network element by aggregating available activity status from one or more activity status reports, each for a downstream network element of the network element, and
the determined user activity status of the network element;
sending the determined activity status in one or more updated activity status reports to an upstream network element; and
adjusting and regulating the performance of associated transport links and internal network element components of the network element in accordance with the determined activity status.

19. The non-transitory machine readable storage device according to claim 18, wherein
the one or more activity status reports comprise activity status for providing full service to users being active in the network.

20. The non-transitory machine readable storage device according to claim 18, wherein determining user activity status involves:
processing received user activity samples to calculate user activity status values based on said user activity samples.

* * * * *